INVENTOR.
James L. Dunn, Jr.
BY Gwynn R Baker
ATTORNEY

United States Patent Office 3,606,860
Patented Sept. 21, 1971

3,606,860
CONTINUOUS TABLET COATING APPARATUS
James L. Dunn, Jr., Lake Jackson, Tex., assignor to The Dow Chemical Company, Midland, Mich.
Filed Oct. 6, 1969, Ser. No. 864,001
Int. Cl. B05c 5/00, 11/115
U.S. Cl. 118—61                                        4 Claims

ABSTRACT OF THE DISCLOSURE

A continuous tablet coating apparatus being a generally kiln-like container rotatable about its longitudinal axis having one end elevated above the other, the elevated end being the inlet to the container and the depressed end being the outlet from the container, each inlet and outlet provided with a gas-tight seal and a valved tube or pipe to conduct solids into and away from the kiln-like container. The inlet tube or pipe has a side arm tube connected to a condenser which is preferably located at least above the plane of the elevated end of the kiln-like container. The kiln-like container has a means for heating the interior, particularly the solids which enter the container, and a liquid distribution means positioned to provide a uniform distribution of a liquid coating composition onto solids within the container. Associated with the container are means to rotate the container.

BACKGROUND OF INVENTION

The procedure for coating tablets is an old art practiced generally in a batchwise manner. The increased demand upon the tablet industry to produce larger quantities of tablets of ever-broadening compositions has created a small effort to find new means for rapid coating of tablets. Few of the proposed techniques have found large scale commercial success primarily because the solvents employed in compositions suitable for rapid and contiguous coating have not been readily recoverable, an economic necessity in view of the high cost of these solvents.

It is therefore an object of the present invention to provide an apparatus suitable for coating tablets on a continuous basis which enables recovery of solvents employed in the coating compositions.

It is another object of the present invention to provide an apparatus capable of employment of low-boiling solvents in a continuous tablet coating process.

These and other objects will become apparent to those skilled in the art to which the invention pertains from the following specification and claims.

BRIEF DESCRIPTION OF INVENTION

The apparatus of the present invention consists of a kiln-like chamber, elevated at one end which is the inlet, provided with inlet and outlet conduits axially centered in the respective ends in a manner to permit rotation of the chamber. Each inlet and outlet are provided with gas-tight seals at their point of penetration through the chamber's ends. A liquid distributing means is located near the inlet to the chamber preferably entering through the inlet conduit. A heating means, either an indirect heater located in the chamber, entering through the outlet conduit or a supply of superheated gases (e.g., vapors) is provided to elevate the temperature of the coating and the tablet to the vaporization temperature of the coating solvent. A condenser, preferably as a side-arm and positioned above the plane of the chamber is in fluid communication with the inlet conduit. The inlet and outlet are each provided with a valve to admit and emit solids which valve is gas tight, e.g., a star valve. Suitable and well-known means are provided to rotate the chamber.

The process employing the apparatus of the present invention comprises introducing tablets to be coated into the rotating chamber through the inlet valve and the inlet conduit, coating the tablets with a coating composition sprayed onto the tablets while tumbling in the chamber as it rotates, heating the interior and particularly the tablets to a temperature at least, and preferably above, the boiling point of the highest boiling solvent to be removed from the coating composition, removing the tablets, which traverse the longitudinal course of the chamber, having the desired thickness of coating material thereon in a dry condition. In the embodiment wherein an indirect heating means is employed, the solvent which fills the chamber upon removal from the coating composition rises to the high end, thence into the inlet tube to the condenser surfaces whereat it is condensed, the liquid collected, and reused to prepare coating formulation. In the embodiment wherein superheated vapors are employed as the heating means, a part of the vapor is condensed, e.g., about that amount removed from the coating formulation, and the remainder withdrawn as vapors, reheated and recycled to the unit.

It is thus seen that the apparatus is especially adapted to carry out a continuous tablet coating using volatile solvents.

DETAILED DESCRIPTION OF INVENTION

Figure 1:
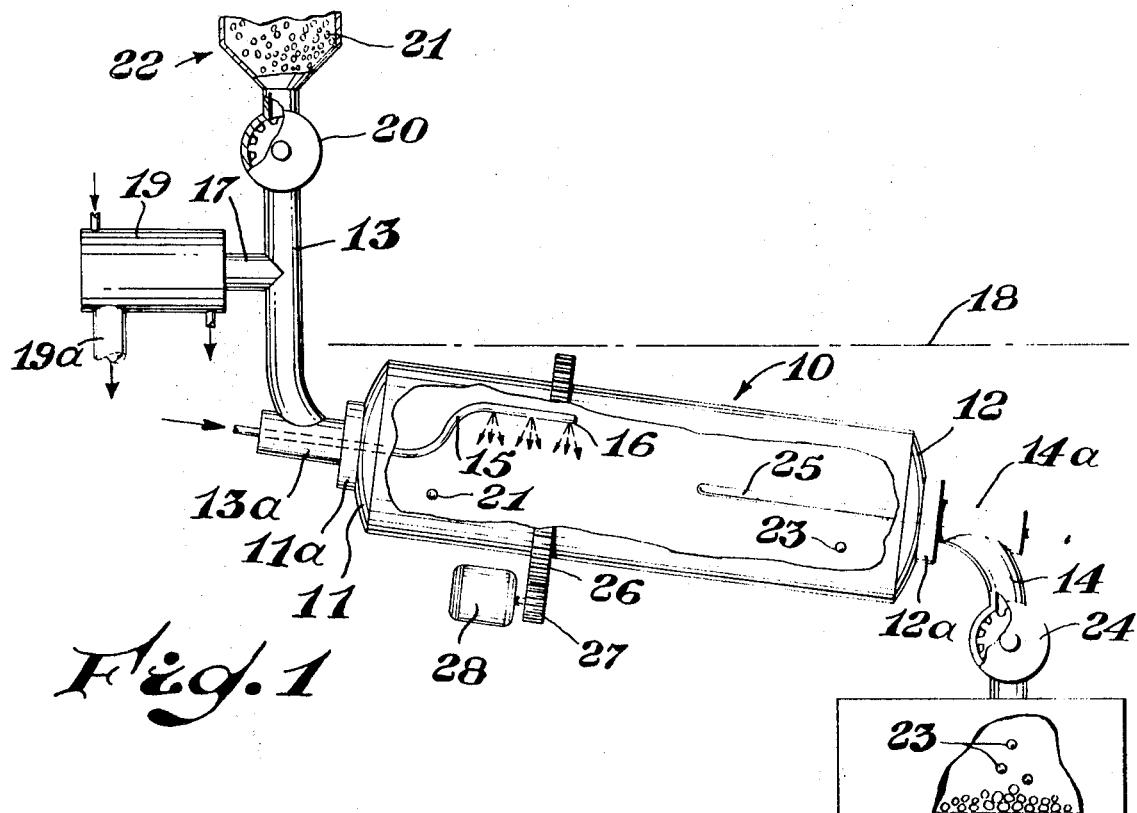
FIG. 1 is a side elevational view of the apparatus which is partly cut away to show the interior of the cylinder.

An apparatus suitable for carrying out a continuous tablet coating process is illustrated in FIG. 1. The apparatus consists of a cylindrical chamber 10 which may be constructed as shown, that is, in the known configuration of a conventional kiln. The cylinder 10 is elevated at one end 11 which is hereafter referred to as the inlet end. The depressed end 12 hereafter referred to as the inlet end. The ends 11 and 12 are closed. Each have a gas-tight rotatable seal 11a and 12a which connects to an inlet conduit or pipe 13 and an outlet conduit or pipe 14, thus completing an inlet and an outlet for material into chamber 10 while it is being rotated. The inlet conduit 13 has a suitable elbow 13a with a gas-tight means for introducing through the conduit 13 and into the cylinder 10, a pipe 15 and associated means 16 for distributing a coating composition over the surface of the tablets 21.

The conduit 13 has a conduit 17 integrally associated in gas-tight relation at a point above a horizontal reference plane 18, above the uppermost end of chamber 10. The conduit 17 connects the pipe 13 and thus the chamber 10 interior to a condenser 19. Located above the junction of pipe 13 and and conduit 17 is a gas-tight valve 20 (known as star valve) which is designed to introduce a solid tablet 21 into conduit 13. Above valve 20 is a chamber 22 which is of any convenient shape to store the tablets prior to introduction into the system.

A somewhat similar arrangement of piping is provided at the outlet end 12 of the chamber. Thus, a conduit or pipe 14 is connected to the rotatable seal 12b and serves as a means for directing coated tablet 23 from the interior of the chamber 10 to a gas-tight solids valve 24, thence to the ambient atmosphere. An elbow 14a has a gas-tight means for accommodating a heater 25 which extends into the chamber 10 above the bed of tablets 23.

The chamber 10 is rotated by means of the ring gear 26, located on the outer periphery of the chamber 10, meshing with a bull gear 27 which in turn is driven by a motor 28.

In operation a tablet 21, to be coated, is introduced into chamber 10 through valve 20 and conduit 13. The coating to be applied, dissolved or suspended in a volatile solvent is sprayed onto the tablet 21 which is tumbling in the bed of the chamber. As the tablet moves downwardly, it passes into the influence of the heater 25 and the solvent is driven from the coating of the tablet. The tablet passes into the outlet conduit 14 through valve 24 into a storage zone 29. The vapors of the solvent being removed from the tablet coating fill the chamber 10, the conduit 13 and finally reach the condenser 19 through conduit 17. Upon contact with the condenser walls, the vapors condense. The condensation creates a zone of lesser pressure which creates a flow of vapors into the condenser 19. The condensed solvent flows from conduit 19a into a suitable storage tank, not shown. It is thus seen no vapors escape from the system, that tablets can be coated readily, and solvent recovered for reuse. The apparatus provides a unique and efficient manner for coating tablets in a continuous manner.

Figure 2:
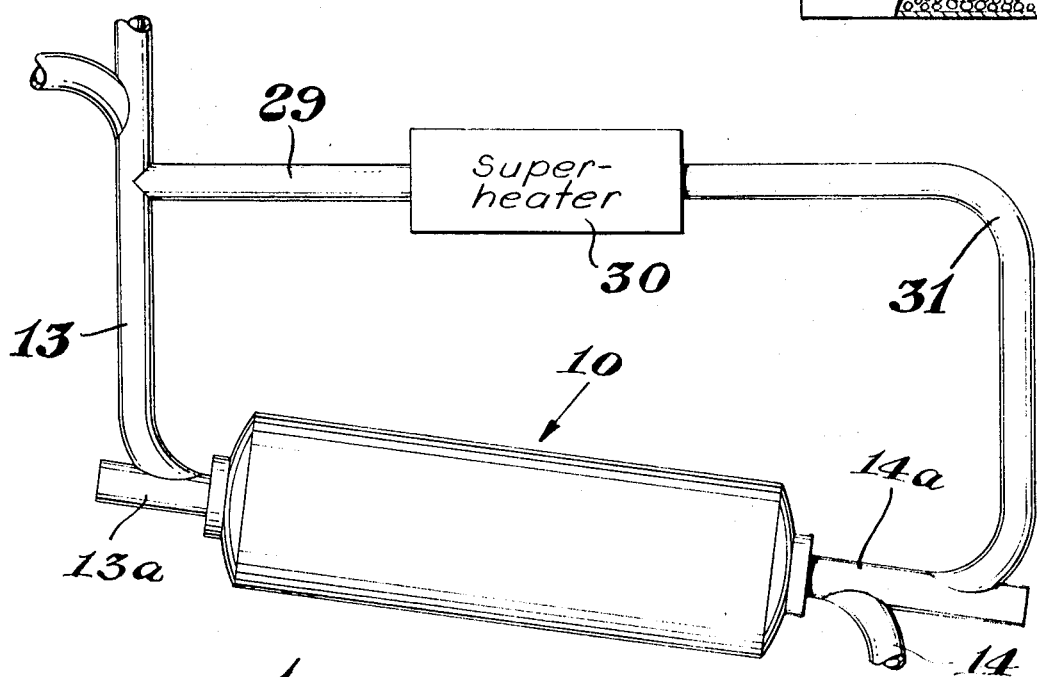
FIG. 2 is a side elevation of a modified form of the apparatus.

FIG. 2 illustrates an apparatus which employs superheated vapors of a solvent as the means for heating the interior of the chamber 10. A conduit 29 is provided to remove vapors from conduit 13 and pass the vapors to a superheater 30 wherein the vapor temperature is raised to the desired level. The so-superheated vapors then travel from the superheater 30 moved by a blower (not shown) through conduit 31 to elbow 14a of outlet conduit 14 for introduction into the interior of chamber 10.

I claim:
1. A continuous tablet coating apparatus comprising:
   (1) a rotatable cylindriacl chamber closed at each end and having one end elevated above the other,
   (2) a fixed inlet conduit through the elevated end,
   (3) a fixed outlet conduit through the other end,
   (4) a gas-tight rotatable seal associated with each of said inlet and outlet conduits,
   (5) a means for heating the interior of said chamber,
   (6) a liquid distributing means located within said chamber,
   (7) a condenser associated with said inlet conduit,
   (8) a gas-tight solids valve associated with each of said inlet and outlet conduits,
   (9) means associated externally with said chamber to rotate the same;
      said conduits associated with said seal and chamber in a manner to maintain a gas-tight seal while the chamber is rotated about its axis and said conduits remain stationary;
      said condenser located above the upper-most end of the elevated end of said chamber;
      said liquid distributing means being located to enter the chamber along the axis of rotation of the chamber and through the inlet conduit and being positioned in the more elevated portion of the chamber; and
      said means for heating entering from the lower portion of the chamber.
2. The apparatus of claim 1 wherein said means for heating the interior of said chamber consists of a heating core located within said chamber.
3. The apparatus of claim 1 wherein said means for heating the interior of said chamber consists of a vapor superheater external of said chamber and vapor carrying conduits connected to the inlet and outlet of said chamber.
4. A continuous tablet coater comprising:
   a rotatable cylinder closed at each end,
   a gas-tight rotatable seal associated with a conduit connected to each end of the cylinder providing an inlet and outlet for solid material,
   a condenser connected to the inlet conduit above the plane of the cylinder,
   a gas-tight solids passing valve above the condenser connection to admit solids to the inlet conduit,
   a storage for solid materials above the valve to supply solids to the cylinder through the valve and conduit,
   a means for spraying a solvent solution of a solids coating material located within said cylinder above the plane of the outlet,
   a means for heating the interior of the cylinder, and
   a gas-tight valve for passing solids from the outlet to the ambient atmosphere.

References Cited

UNITED STATES PATENTS

| | | | |
|---|---|---|---|
| 1,745,437 | 2/1930 | Motley | 118—61 |
| 2,024,248 | 12/1935 | Rafton | 118—61 |
| 2,530,403 | 11/1950 | Seaman | 259—3X |

JOHN P. McINTOSH, Primary Examiner

U.S. CL. X.R.

118—303; 259—3